INVENTOR
Joseph B. Menton.
BY
ATTORNEY

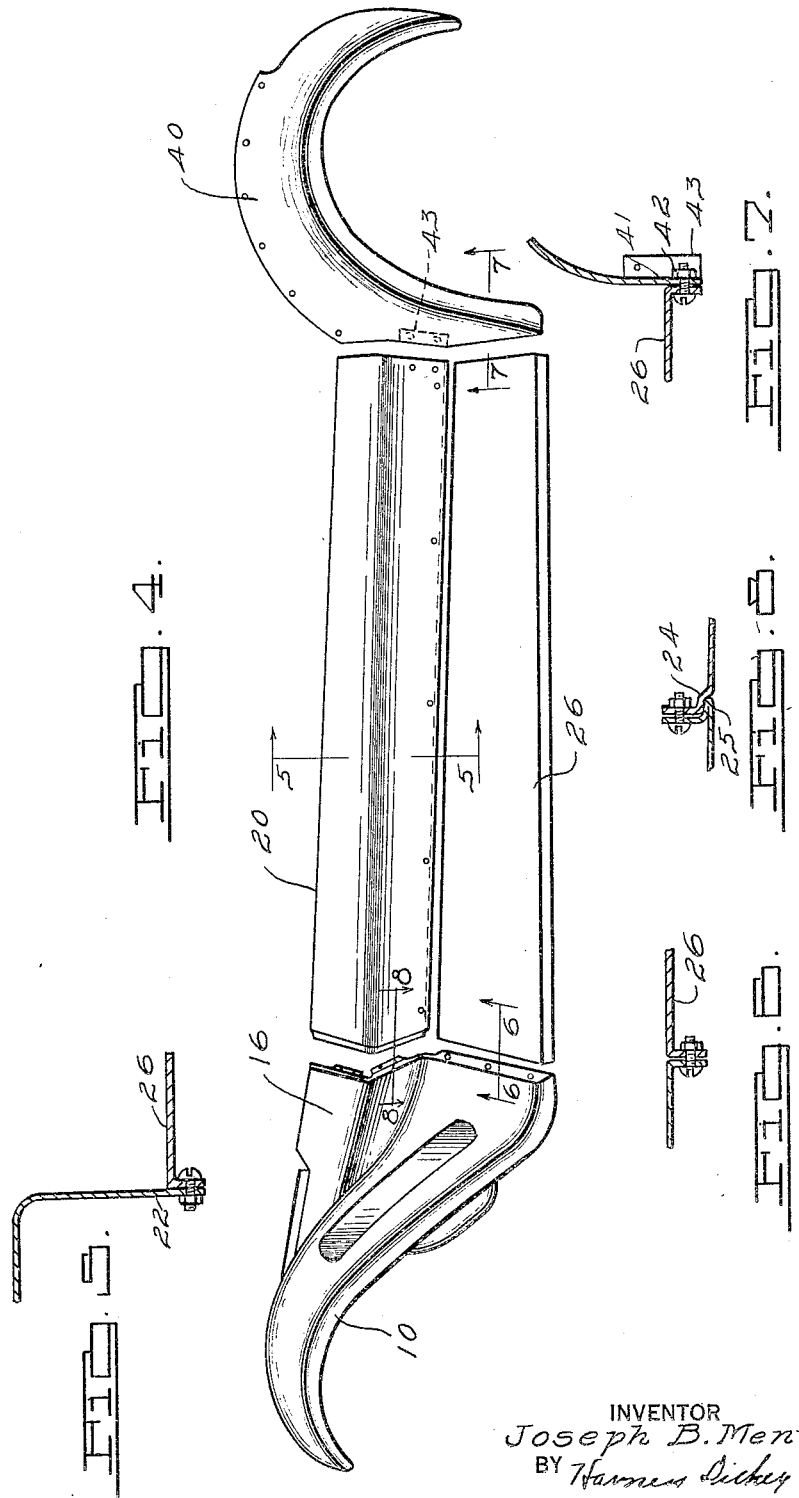

Patented June 20, 1933

1,914,669

UNITED STATES PATENT OFFICE

JOSEPH B. MENTON, OF DETROIT, MICHIGAN, ASSIGNOR TO MURRAY CORPORATION OF AMERICA, A CORPORATION OF DELAWARE

FENDER

Application filed August 26, 1929. Serial No. 388,291.

One object of my invention is to provide a front fender for a vehicle which is simply and cheaply constructed and composed of a minimum of parts.

Another object of my invention is to provide a combination of front fender and a splash panel, incorporating in one piece what has heretofore been made and applied in two or more pieces.

Another object of my invention is to provide a front and rear fender, running board and splash panel assembly, which may be assembled and secured together prior to application to the vehicle, and applied to the vehicle as a unit.

With these and other objects in view, my invention consists in the arrangement, combination and construction of the various parts of my improved device, as described in the specification, claimed in my claims, and shown in the accompanying drawings, in which:

Fig. 4 is a perspective of the fender, running board and splash panel assembly, the parts being slightly separated to better illustrate the construction in relation to each other.

Fig. 5 is a section taken on the line 5—5 of Fig. 4.

Fig. 6 is a sectional view taken on line 6—6 of Fig. 4.

Fig. 7 is a view taken on line 7—7 of Fig. 4.

Fig. 8 is a view taken on line 8—8 of Fig. 4.

Figure 1:
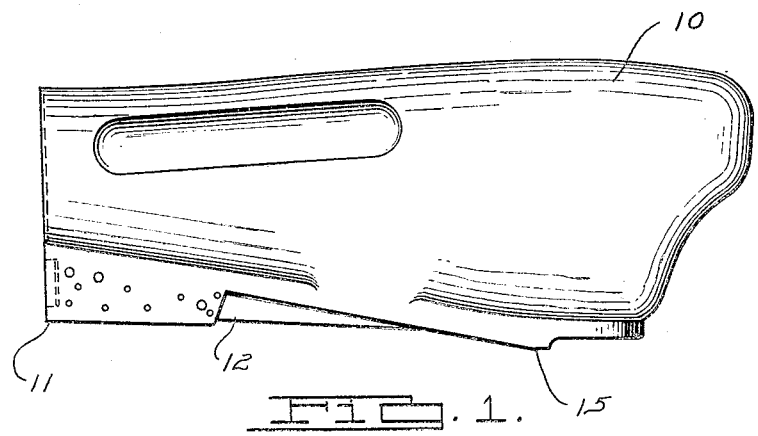
Fig. 1 is a plan view of the front fender embodying my invention.
Figure 2:
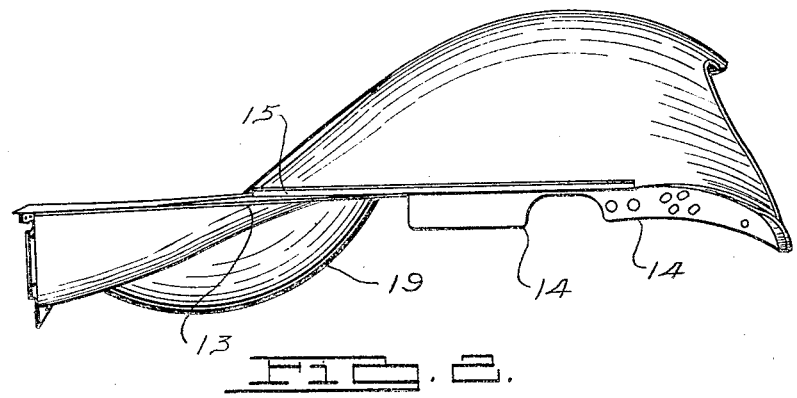
Fig. 2 is a side elevation of said fender.
Figure 3:
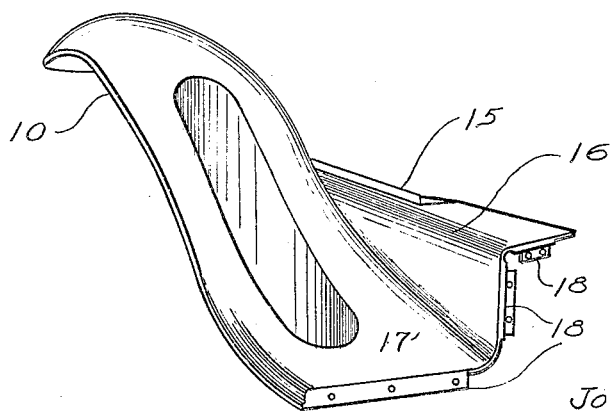
Fig. 3 is a perspective of said fender.

Referring now to Figs. 1, 2 and 3, it will be observed that I have shown a left front fender for an automotive vehicle comprising a fender proper designated generally by the numeral 10. Integral with the inner side of the fender is formed a lateral flange 11 which is flattened and shaped to fit upon the chassis frame of a motor vehicle. Secured to the under side of this flattened portion 11 is a reinforcing member 12 which, in its rear portion, comprises a flat strip of metal 13 and in its front portion comprises an angular shaped member 14 with the open side of the angle presented inwardly. The forward end of the member 12 is shaped to conform to the contour of the forward end of the chassis frame, which usually curves downwardly. This reinforcing member 12 is fastened to the under side of the flattened margin of the fenders 11 by spot welding or other suitable means. The depending flange of the angle portion 14 is adapted to fit along the outside of the chassis frame and the horizontal portion of the member is adapted to lie on the top of the chassis frame and may be secured thereto by any suitable means. This reinforcing member may be omitted if desired and the fender may be secured directly to the chassis frame. A portion of the inner edge of the flattened portion 11 is turned upwardly to form a vertical flange 15 which acts as an abutment for the edge of the engine hood when the fender is assembled on the chassis frame. The rear inner portion of the fender designated generally by the numeral 16 is shaped to form a splash panel or apron between the chassis frame and the lower rear portion of the fender. The conventional practice is to form such apron separately or integral with the main splash panel designated by the numeral 20 in Fig. 4, and such conventional construction makes necessary a long joint along the inner edge of the rear portion of the fender indicated by the dotted line 17 in Fig. 3.

My construction provides a much neater appearance and eliminates one of the unsightly spots in the present day construction. The rear edge of the fender is provided with lateral flanges 18 which may be joined to the downwardly extending flange of the running board 26, as shown in Fig. 6, and to the splash panel 20 as hereinafter described.

A tire well designated generally by the numeral 19 is shown in this fender construction, although it may be omitted if desired.

The fender is simply constructed, and if the tire well is omitted, it is formed from a single stamping which may be cheaply and easily produced.

In Fig. 4 I have shown an assembly comprising a front fender 10, spash panel 20, running board 26, and rear fender 40. The flange 18 on the rear edge of the apron portion 16 of the front fender is preferably formed with a lip 25, the cross section of which is shown in Fig. 8, and the adjacent edge of the splash panel 20 is formed with a shouldered flange 24 as shown in Fig. 8, in order that there may be a flush joint between the fender 10 and the splash panel 20 at this point. The apron portion 16 of the fender 10, and the main splash panel 20 may be secured together by bolts or other suitable means inserted through suitable openings in their depending flanges, as shown in Fig. 8. The lower edge 22 of the splash panels 20 may be secured by bolts or other suitable means to the rear depending flange of the running board 26, as shown in Fig. 5. The upper rear edge of the splash panel 20 is positioned upon the top of the chassis frame, and is secured thereto by bolts or other suitable means in the conventional manner. The rear fender 40 is of conventional construction and its lower edge 41 may be secured to the rear depending flange of the running board 26 by bolts or other suitable means as shown in Fig. 7. The inner edge of the lower portion of the the fender 40 may be flanged rearwardly as shown in the dotted lines 43 in Fig. 4 and attached to the rear vertical edge of the splash panel 20 by bolts or other suitable means.

With the construction shown it is possible for the front fender 10, the splash panel 20, running board 26, and the rear fender 40 to be secured together prior to their application to the vehicle frame, and then applied as a unit; or if desired the front fender, running board and splash panel may be secured together and applied as a unit and the rear fender applied later.

Formal changes may be made in the specific embodiment of the invention described without departing from the spirit or substance of the broad invention, the scope of which is commensurate with the appended claims.

What I claim is:

1. A wheel fender for an automobile comprising a sheet metal stamping having reversely arched wheel guarding portion and a laterally extending inner edge portion disposed in substantially the horizontal median plane of said reversely arched portion and connected thereto by a continuous integral apron portion, said inner edge portion having upwardly an extending hood abutment flange, and an integrally associated longitudinal member at its under side shaped to nest with a longitudinal chassis frame member.

2. A wheel fender for an automobile comprising a sheet metal stamping having a reversely arched wheel guarding portion and a laterally extending inner edge portion disposed in substantially the horizontal median plane of said reversely arched portion and connected thereto by a continuous integral apron portion, said inner edge portion having an upwardly extending hood abutment flange, a wheel well formed in the lower part of the reversely arched portion, and an integrally associated longitudinal member at its under side shaped to nest with a longitudinal chassis frame member.

3. A wheel fender for an automobile comprising a sheet metal stamping having a reversely arched wheel guarding portion and a laterally extending inner edge portion disposed in substantially the horizontal median plane of said reversely arched portion and connected thereto by a continuous integral apron portion, said inner edge portion having an upwardly extending hood abutment flange and extending frontwardly to form a cover for the front portion of the chassis frame member.

JOSEPH B. MENTON.